INVENTOR.
NILS O. ROSAEN
BY
ATTORNEYS

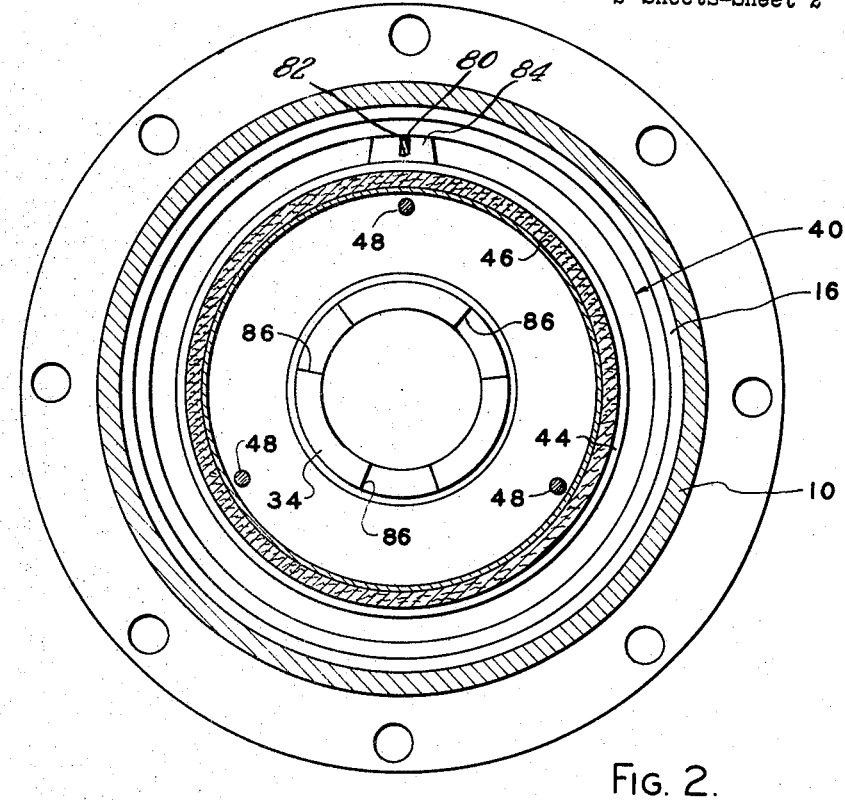
FIG. 2.
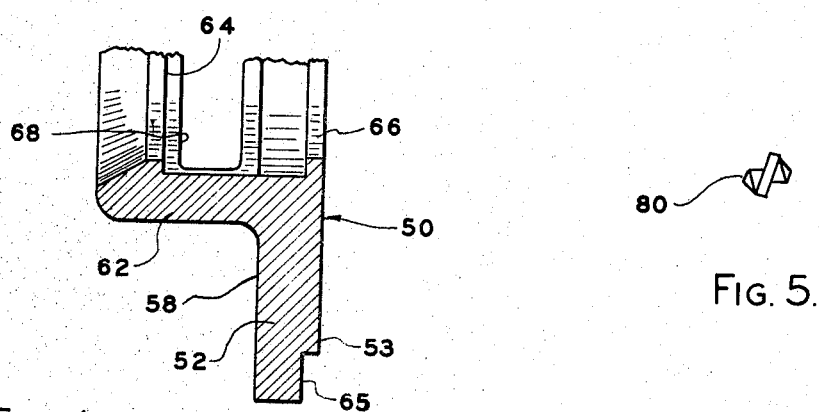
FIG. 4.
FIG. 5.
INVENTOR.
NILS O. ROSAEN
BY
ATTORNEYS

United States Patent Office 3,244,282
Patented Apr. 5, 1966

3,244,282
FLUID FILTER DEVICES
Nils O. Rosaen, Bloomfield Hills, Mich., assignor to The Rosaen Filter Company, Hazel Park, Mich., a corporation of Michigan
Filed Mar. 4, 1963, Ser. No. 262,702
17 Claims. (Cl. 210—90)

The present invention relates to fluid filtering systems, particularly to a filtering device having a valve operable upon removal of the filter element to close fluid flow to the filter chamber and to open a fluid path directly from the inlet to the outlet, and more particularly to means insuring that the valve will move from an open position to a position closing communication with the filter chamber without becoming jammed in some intermediate position.

To change the filter elements in many of the filtering devices presently in use, it is necessary to completely shut down the fluid system until the element has been replaced. A copending application, Ser. No. 190,764, filed April 27, 1962, discloses a filter device which is provided with a valve operable to close off the filter chamber and open a fluid path between the inlet and the outlet upon removal of the filter element so that the fluid system can continue to operate while the filter element is being changed. It has been found that although the valve of this filter device will operate properly most of the time, sometimes the valve will tilt slightly and become jammed in an intermediate position and fluid will continue to flow into the filter chamber. When this occurs, fluid will drain out of the device as the filter is removed, resulting in a difficult clean up operation and loss of fluid and necessitating that the system be shut down until the element can be replaced and the valve restored to working order.

It is an object then of the present invention to facilitate the replacement of filter elements in filter devices by providing valve means operable to freely move to a position closing fluid flow to the filter chamber upon removal of the filter element.

It is still another object of the present invention to increase the operating time of fluid systems by providing a filtering device having means permitting replacement of the filter element without disrupting the operation of the fluid system.

It is yet another object of the present invention to improve fluid filter devices having a valve for closing communication with the filter chamber when the filter element is removed by providing guide means preventing the valve from becoming jammed in an intermediate position.

Other objects and advantages will readily occur to one skilled in the art to which the invention pertains upon reference to the following drawings in which:

FIG. 2 is a cross sectional view taken substantially on line 2—2 of FIG. 1.

FIG. 4 is an enlarged fragmentary sectional view of structure shown in FIG. 1, and FIG. 5 is an elevational end view of a preferred actuator element of the present invention.

Figure 1:
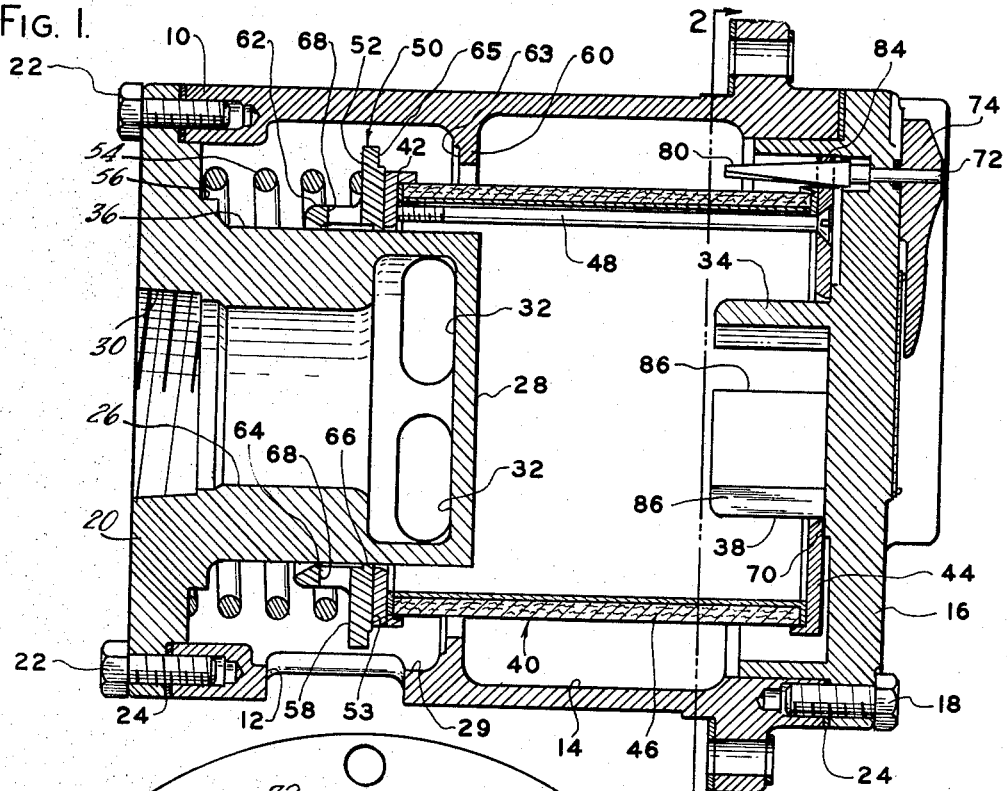
FIG. 1 is a longitudinal cross sectional view of a preferred fluid filter device of the present invention.

Now referring to the drawings for a more detailed description of the present invention, a preferred filter device is illustrated as comprising a substantially cylindrical housing 10 provided near one end with a fluid inlet 12 and substantially cylindrical chamber 14. A closure plate 16 is secured to the housing 10 preferably by bolts 18 and closes one end of the chamber 14. An end cap 20 closes the other end of the chamber 14 and is secured to the housing by bolts 22. Sealing gaskets 24 are provided between abutting portions of the housing 10, the closure plate 16, and the end cap 20.

The end cap 20 is preferably provided with a tubular extension 26 extending axially into the chamber 14 and having a closed inner end 28. The tubular extension 26 defines an annular inlet chamber 29 communicating with the chamber 14 and a fluid outlet 30. A plurality of annularly spaced slots 32 is provided adjacent the inner end of the tubular extension 26.

The closure plate 16 is provided with a cylindrical boss portion 34 which extends into the chamber 14 and is substantially coaxial with respect to the tubular extension 26.

The external surface 36 of the tubular extension 26 is finished to provide a smooth cylindrical surface which, with the similarly finished external surface 38 of the boss portion 34, provides guide means which slidably carry a filter assembly 40.

The filter assembly 40 preferably comprises a pair of spaced annular flanged members 42–44 and a tubular filter element 46 carried therebetween by a plurality of annularly spaced bolt members 48 which pass through the member 44 and are threaded into member 42 to form a unitary assembly.

A valve member 50 is slidably carried on the tubular extension 26 and is provided with a radially outwardly extending plate portion 52, the inner face 53 of which engages the member 42 when the filter assembly 40 is positioned in the chamber 14. A spring 54 is disposed about the tubular extension 26 and is seated at one end in a suitable recess 56 provided in the end cap 20 and at the other end against the outer face 58 of the plate portion 52. A fixed annular valve seat 60 is provided on the inner periphery of the housing 10 in a position substantially coaxial with the axis of the tubular extension 26. The valve seat 60 is provided with an annular recess 63 and the valve member 50 is provided with an annular recess 65 complementary to the recess 62 so that as the valve member 50 is moved into engagement with the valve seat 60, as will be explained in more detail below, fluid flow between the inlet chamber 29 and the chamber 14 is blocked.

The valve member 50 is further provided with an axially extending sleeve portion 62 which is integrally connected at its inner end with the plate portion 52. The sleeve portion 62 is provided with a pair of axially spaced radially inwardly extending flange portions 64–66 which slidably engage the external surface 36 of the tubular extension 26. As can best be seen in FIG. 4, the flange portion 66 extends radially inwardly a slightly greater distance than does the flange portion 64. The sleeve portion 62 acts as a guide and insures that the valve member 50 will slide along the surface of the tubular extension 26 and into engagement with the valve seat 60 without tilting and becoming locked in some intermediate position. By constructing flange portion 64 with a slightly greater inner radius than the flange portion 66 sufficient tilting of the valve member 50 is permitted to insure proper seating with the valve seat 60 even though the face of the valve seat 60 or the inner face 53 of the plate portion 52 may vary slightly from being normal to the axis of the tubular extension 26, yet the plate portion 52 can not tilt enough to become jammed on the surface 36 of the extension 26.

The sleeve portion 62 is provided with a plurality of annularly spaced openings 68.

The filter assembly 40 will normally be maintained in the position illustrated in FIG. 1 with the spring 54 urging the flanged member 44 into engagement with an annular shoulder 70 provided on the inner face of the closure plate 16. The shoulder 70 is preferably concentric to and closely adjacent the boss portion 34 so that a space is provided as shown between the closure plate 16 and the flanged member 44. The filter assembly 40 is of sufficient length that in this position it prevents the valve member 50 from engaging in the valve seat 60 and retains the openings 68 in the sleeve 62 out of registry with the slots 32 provided in the tubular extension 26.

In this position, fluid enters the inlet 12 and the inlet chamber 29 and flows past the open valve 50 into the filter chamber 14 through the filter element 46 and through slot 32 and out the outlet 30.

As the filter element 46 becomes clogged, the resulting increase in pressure differential across the flanged members 42–44 will cause the filter assembly 40 to move against the force of the spring 54. The space between inner face of the closure plate 16 and flanged member 44 provided by the shoulder 70 facilitates entry of fluid pressure behind the member 44 to cause initial movement of the filter assembly 40.

Figure 3:
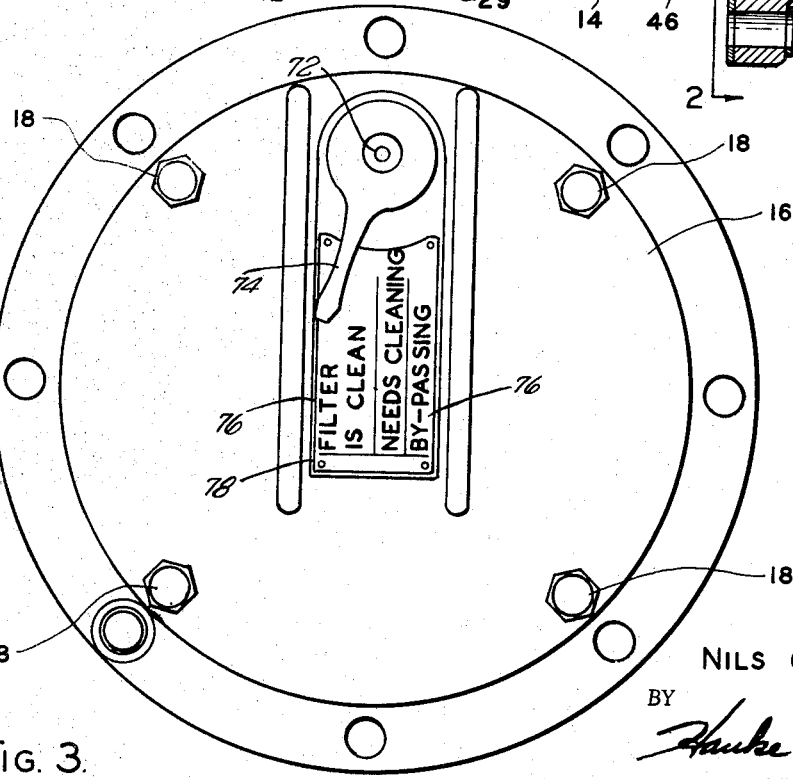
FIG. 3 is an elevational end view of the preferred filter device as seen substantially from the right side of FIG. 1.

As can best be seen in FIGS. 1–3, a shaft 72 is rotatably carried in the closure plate 16. A pointer element 74 located on the exterior surface of the closure plate 16 and secured to the shaft 72 to rotate therewith points to indicia 76 provided on an indicator plate 78. An actuator element 80 is carried on the interior end of the shaft 72 in a position substantially coaxial therewith and extends through a rectangular slot 82 formed in a radial extension 84 of the flanged member 44. The actuator element 80 as can best be seen in FIG. 5 preferably comprises an elongated strip having a substantially uniform twist about its longitudinal axis from end to end. As the filter assembly 40 moves axially in response to changes in the pressure differential across the flanged members 42–44, the twist of the actuator element 80 in combination with the slot 82 produces a corresponding rotation of the shaft 72 and the pointer element 74. Since the rotational position of the pointer element 74 depends upon the axial position of the filter assembly 40 and this position in turn will depend upon the condition of the filter element 46, it is apparent that indicia 76 can be provided which will indicate to the operator the condition of the filter element 46.

The boss portion 34 is provided at its inner end with a plurality of annularly spaced slots 86 as can best be seen in FIG. 2. As clogging of the filter element 46 increases and before the danger of rupturing is produced the filter assembly 40 will have moved sufficiently away from the closure plate 16 to open a fluid path between the flanged member 44 and the inner face of the closure plate 16 and through the slots 86 thus bypassing the filter element 46. This bypassing condition is also indicated by the pointer element 74 and the indicator plate 78.

When it is necessary to remove the filter assembly 40 for cleaning or replacing the filter element 46, the bolts 18 are removed to permit removal of the closure plate 16. As the filter assembly 40 is removed, the spring 54 will move the valve 50 into engagement with the valve seat 60 to block fluid flow from the inlet chamber 29 to the chamber 14. Movement of the valve 50 will also produce registry of the openings 68 and the slots 32 so that fluid flow is opened directly between the inlet chamber 29 and the outlet 30. In this way the filter element 46 can be replaced without necessitating shutting down operation of the fluid system and with little loss of fluid.

By providing the axially spaced flange portions 64–66, for the sleeve portion 62 of the valve 50 with inner radii of slightly different dimensions as described above, the present invention provides a valve 50 in which tilting which would result in the valve becoming jammed in some intermediate position is prevented. Yet sufficient tilting is permitted by the flange portion 64 to allow the valve 50 to adjust slightly to provide a proper seating between the valve 50 and the valve seat 60 even though these members may not be perfectly normal to the axis of the tubular extension 26. Without this provision the filter device would be quite expensive to produce since the machining of the valve 50 and seat 60 within the close tolerances which would be required would result in greatly increased manufacturing costs.

Although I have described but one embodiment of the present invention, it is apparent that many modifications and changes can be made without departing from the spirit of the invention or the scope of the appended claims.

I claim:

1. A device adapted for use in a fluid system having a fluid user and a source of fluid under pressure,
   (a) a housing having an inlet adapted for connection with the fluid source and an outlet adapted for connection with the fluid user,
   (b) said housing defining a chamber,
   (c) an element removably carried in said chamber,
   (d) a valve including a first and a second fixed valve part and an annular axially slidable movable valve part and being operable to normally direct fluid flow from said inlet through said chamber and out said outlet,
   (e) urging means operable upon said element being removed from said chamber to urge said movable valve part to a position closing communication between said inlet and said chamber and opening a fluid path directly from said inlet to said outlet,
   (f) said first fixed valve part comprising a tubular extension of said housing axially slidably carrying said movable valve part,
   (g) said movable valve part comprising an annular plate engageable with said second fixed valve part upon movement of said movable valve part in one direction and an axially extending sleeve portion, said sleeve portion having a pair of radially inwardly extending axially spaced flange portions engaging said first fixed valve part, and
   (h) the flange portion axially spaced farther from said plate extending radially inwardly a lesser distance than the other of said flange portions whereby as said element is removed, said plate of said movable valve part will be moved into seating engagement with said second fixed valve part without said movable valve part becoming jammed at some intermediate position.

2. The device as defined in claim 1 and in which said element comprises an axially slidable filter element positioned in said chamber in engagement with said movable valve part to normally retain said valve in a position opening fluid flow from said inlet to said chamber.

3. The device as defined in claim 2 and in which said urging means comprises a single spring operable to both oppose axial movement of said filter element and to urge said valve to a position closing communication between said inlet and said chamber.

4. The device as defined in claim 2 and including pressure responsive means axially slidably moving said filter element in response to changes in the pressure differential across said filter element.

5. The device as defined in claim 4 and including means mounted exteriorly of said housing and actuated by means extending through said housing and controlled by axial movement of said filter element to indicate the condition of said filter element.

6. The device as defined in claim 4 and including a bypass valve means controlled by the axial movement of said filter element and opened only after a predetermined axial movement of said filter element for bypassing incoming fluid around said filter element.

7. The device as defined in claim 4 and including a bypass valve means controlled by the axial movement of said filter element and opened only after a predetermined axial movement of said filter element to bypass fluid from said inlet around said filter element and indicating means mounted exteriorly of said housing and controlled by axial movement of said filter element to indicate the condition of said filter element.

8. A fluid filter device for fluid systems comprising
(a) a housing defining a filter chamber and said housing having an inlet leading fluid to said filter chamber and outlet leading from said filter chamber,
(b) a tubular filter element removably carried in said filter chamber in a position such that fluid from said inlet will pass through the wall of said element on its way to said outlet,
(c) guide means carried by said housing and axially slidably carrying said filter element whereby changes in the pressure differential across said filter element will produce axial movement of said filter element,
(d) said guiding means including a tubular extension of said housing,
(e) a valve comprising a movable element axially slidably carried on said tubular extension of said housing and normally held in a position opening communication between said filter chamber and said outlet by said filter element and a fixed valve part carried by said housing,
(f) spring means biasing said filter element against axial movement and upon removal of said filter element urging said movable element to a position engaging said fixed valve part carried by said housing to close communication between said inlet and said filter chamber, and
(g) means carried by said movable element and engaging said tubular extension to maintain the movement of said movable element sufficiently coaxial with the axis of said tubular extension to prevent said movable element from becoming jammed at some intermediate position upon removal of said filter element but permitting the axis of said movable element to deviate from the axis of said tubular extension an amount sufficient to insure proper seating engagement of said movable element with said fixed valve part,
(h) said last mentioned means comprising an axially extending sleeve portion of said movable element having a pair of radially inwardly extending axially spaced flange portions engaging said tubular extension, one of said flange portions extending radially inwardly a lesser distance than the other of said flange portions.

9. The device as defined in claim 8 and in which
(a) said tubular extension is provided with a hollow portion communicating with said outlet and a plurality of annularly spaced slots opening to said hollow portion, and
(b) said sleeve portion being provided with a plurality of annularly spaced openings positioned to register with said slots when said movable element has moved to a position closing communication between said inlet and said filter chamber whereby communication is thereupon opened between said inlet and said outlet.

10. The device as defined in claim 8 and including a second valve means associated with said tubular extension and controlled by said movable valve element for opening flow directly from said inlet to said outlet upon removal of said filter element.

11. The device as defined in claim 8 and including indicating means mounted exteriorly of said housing and actuated by means extending through said housing and controlled by axial movement of said filter element to indicate the condition of said filter element.

12. The device as defined in claim 8 and including a bypass valve means controlled by the axial movement of said filter element and opened only after a predetermined axial movement of said filter element for bypassing incoming fluid around said filter element.

13. A fluid filter device comprising
(a) a housing defining an inlet chamber and a filter chamber,
(b) an axially disposed tubular outlet extension formed at one end of said housing and extending through said inlet chamber into one end of said filter chamber and provided with an opening at its inner end,
(c) a closure plate closing the other end of said housing,
(d) an inwardly extending boss portion carried by said closure plate and axially disposed with respect to said tubular extension,
(e) a filter assembly comprising a tubular filter element and end caps affixed thereto positioned within said filter chamber with one end cap slidably engaging said tubular extension and the other end cap slidably engaging said boss portion,
(f) spring means biasing said filter assembly toward said closure plate,
(g) a valve element slidably disposed on said tubular extension between said one end cap and said spring means,
(h) said valve element being movable along said tubular extension under the influence of said spring means to engage a fixed valve seat carried in said housing to block fluid flow between said inlet and said filter chamber whenever said filter assembly is removed from said filter chamber but normally being held by said filter assembly in a position permitting said flow when said filter assembly is in place, and
(i) means carried by said valve element and engaging said tubular extension to maintain the movement of said valve element sufficiently coaxial with the axis of said tubular extension to prevent said valve element from becoming jammed at some intermediate position upon removal of said filter element but permitting the axis of said valve element to vary from the axis of said tubular extension an amount sufficient to permit proper seating engagement of said valve element with said fixed valve seat,
(j) said last mentioned means comprising an axially extending sleeve portion of said valve element having a pair of radially inwardly extending axially spaced flange portions engaging said tubular extension, one of said flange portions extending radially inwardly a lesser distance than the other of said flange portions.

14. The device as defined in claim 13 and in which said valve element includes means for connecting said inlet directly with said tubular outlet whenever the filter assembly is removed from the filter chamber.

15. A device adapted for use in a fluid system comprising
(a) a housing defining an inlet, an outlet, a chamber and having a fixed valve seat,
(b) an element removably carried in said chamber,
(c) a tubular extension carried by said housing and into said chamber,
(d) a valve element slidably carried on said tubular extension and operable to normally direct fluid flow from said inlet through said chamber and out said outlet, means to move said valve element to a position engaging said fixed valve seat to close fluid flow from said inlet to said chamber upon removal of said element, and
(e) means carried by said valve element and engaging said tubular element to maintain the movement of said valve element sufficiently coaxial with the axis of said tubular extension to prevent said valve element from becoming locked in an intermediate position upon removal of said element but permitting the axis of said valve element to vary from the axis of said tubular extension an amount sufficient to permit proper seating engagement of said valve element with said fixed valve seat, (f) said last mentioned means comprising an axially extending sleeve portion of said valve element having a pair of axially spaced radially inwardly extending flange portions engaging said tubular element, one of said flange portions extending radially inwardly a lesser distance than the other of said flange portions.

16. The device as defined in claim 15 and in which
(a) said housing includes a pair of ports,
(b) said guide member having a passage connected with one port and opening radially to the surface slidably engaged by said valve element flanges,
(c) said valve element having radial ports intermediate said flanges and arranged to align with said guide member passage only when said valve face is seated on said valve seat,
(d) said second housing port being open to that end of the chamber on the side of the valve seat containing said valve element whereby said housing ports communicate through the valve element ports only when the valve is closed.

17. In a fluid valve device,
(a) a housing defining a longitudinal fluid chamber,
(b) an annular valve seat disposed in said chamber and lying in a plane substantially normal to the axis of said chamber,
(c) a valve element in said chamber and having a valve face disposed substantially parallel with and axially aligned with said valve seat,
(d) a guide member extending axially with respect to and radially spaced from said valve seat and axially slidably carrying said valve element whereby to close the valve when the face contacts the seat,
(e) said valve element having at least a pair of axially spaced flanges each provided with an axially narrow edge closely adjacent said guide member,
(f) one of said edges being relatively closely slidably fitting on said guide member,
(g) the other of said edges being spaced radially from said guide member a distance sufficient to permit enough tilting of said valve element to compensate for normal variations of parallelism between the valve seat and the valve face and to still prevent jamming of said first edge against the guide member.

References Cited by the Examiner
UNITED STATES PATENTS

| | | | |
|---|---|---|---|
| 922,657 | 5/1909 | Morsey | 210—234 |
| 2,544,244 | 3/1951 | Vokes | 210—234 |
| 2,932,400 | 4/1960 | Scavuzzo | 210—235 |
| 3,053,389 | 9/1962 | Rossen | 210—90 |
| 3,056,503 | 10/1962 | Rooss | 210—234 |
| 3,076,335 | 2/1963 | Rossen | 73—198 |
| 3,080,972 | 3/1963 | Smith | 210—90 |

REUBEN FRIEDMAN, *Primary Examiner.*

HERBERT L. MARTIN, *Examiner.*